United States Patent
Koselek et al.

(10) Patent No.: US 10,894,276 B2
(45) Date of Patent: Jan. 19, 2021

(54) DECOKING PROCESS

(71) Applicant: NOVA Chemicals (International) S.A., Fribourg (CH)

(72) Inventors: Michael Koselek, Red Deer (CA); Leslie Benum, Red Deer (CA); Vasily Simanzhenkov, Calgary (CA); Hany Farag, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 27 days.

(21) Appl. No.: 15/921,714

(22) Filed: Mar. 15, 2018

(65) Prior Publication Data

US 2018/0281033 A1    Oct. 4, 2018

(30) Foreign Application Priority Data

Mar. 30, 2017    (CA) ..................... 2962667

(51) Int. Cl.

| | |
|---|---|
| *B08B 9/08* | (2006.01) |
| *B01J 19/00* | (2006.01) |
| *B01J 6/00* | (2006.01) |
| *C10G 9/16* | (2006.01) |
| *C10G 9/12* | (2006.01) |
| *C10G 75/04* | (2006.01) |
| *C10G 9/20* | (2006.01) |
| *B01J 19/02* | (2006.01) |

(52) U.S. Cl.
CPC ............ *B08B 9/0865* (2013.01); *B01J 6/008* (2013.01); *B01J 19/0026* (2013.01); *B01J 19/02* (2013.01); *C10G 9/12* (2013.01); *C10G 9/16* (2013.01); *C10G 9/203* (2013.01); *C10G 75/04* (2013.01); *B01J 2219/00247* (2013.01); *B01J 2219/0286* (2013.01); *B08B 2209/08* (2013.01); *C10G 2300/1096* (2013.01)

(58) Field of Classification Search
CPC .... B08B 9/0865; B08B 2230/01; B01J 6/008; B01J 19/0026; B01J 19/02; B01J 2219/00247; B01J 2219/0286; B01L 19/0026; B01L 19/02; B01L 2219/00247; B01L 2219/0286; C10G 9/12; C10G 9/16; C10G 9/203; C10G 75/04; C10G 2300/1096

See application file for complete search history.

(56) References Cited

U.S. PATENT DOCUMENTS

| | | | |
|---|---|---|---|
| 3,671,198 A * | 6/1972 | Wallace | C10G 9/20 165/154 |
| 5,298,091 A | 3/1994 | Edwards, III et al. | |
| 5,446,229 A * | 8/1995 | Taylor | C10G 9/16 585/648 |
| 6,228,253 B1 * | 5/2001 | Gandman | C10G 9/16 196/122 |
| 6,602,483 B2 | 8/2003 | Heyse et al. | |
| 8,152,993 B2 | 4/2012 | De Haan et al. | |
| 8,791,314 B2 | 7/2014 | Fremy et al. | |
| 2004/0216815 A1 * | 11/2004 | Cai | C10G 75/00 148/633 |
| 2010/0069695 A1 * | 3/2010 | Fremy | C07C 321/14 585/650 |

* cited by examiner

*Primary Examiner* — Mikhail Kornakov
*Assistant Examiner* — Natasha N Campbell
(74) *Attorney, Agent, or Firm* — Thomas J. Styslinger

(57) ABSTRACT

In chemical processes for cracking hydrocarbons, reactors are subject to coking. This results in carburization of the metal substrate for the reactor leading to a reduced reactor life. If the reactor is subject to a decoke process, followed by a steam scour and nitriding there is a reduced tendency to carburization of the metal substrate improving the reactor life.

10 Claims, No Drawings

DECOKING PROCESS

The present disclosure relates to the field of decoking industrial apparatuses operating at elevated temperatures in a hydrocarbon containing environment. The apparatuses are typically taken off-line or may require being shut down on a periodic basis to remove coke accumulated on the internal surfaces of the device. The process disclosed herein is suitable for decoking any cracking process where larger hydrocarbon molecules are converted to smaller molecules at elevated temperatures and coke is a byproduct on the cracking tubes or reactors, such as a fluid catalyst cracker or a steam cracker to produce alkenes from alkanes at elevated temperatures.

In an industrial steam cracker there are typically a number of "furnaces". Within the furnace are metal coils or passes which pass through a furnace at an elevated temperature typically above about 750° C., usually in the range of 800° C. to 900° C. At these temperatures the feed, typically an alkane, usually a lower molecular weight alkane such as ethane, propane, butane and mixtures thereof, or heavier feed stock including naphtha, heavy aromatic concentrate (HAC) and heavy aromatic gas oil (HAGO) or any of the vacuum gas oils, undergoes a rearrangement yielding alkenes, including but not limited to ethylene, propylene and butene and hydrogen and other coproducts. Over time carbon and coke build up on the internal surface of the pass increasing the pressure drop across the tube and reducing the thermal and cracking efficiency process in that tube or coil. The coil is taken off line (hydrocarbon is no longer fed to the coil) and the coil is decoked and then returned to operation.

In decoking a steam cracker several different methods are available. In one method, the coke is physically scoured from the internal reactor walls. Typically, a relatively high velocity stream of air, steam or a mixture there of passes through the coil resulting in small particulate materials being included in the stream. As the particulates pass through the furnace tube or coil, the coke on the internal wall is scoured off. One issue with this type of treatment is the erosion of the internal surface of the tube or pass, fittings and downstream equipment. An additional concern with this type of treatment is downstream plugging with coke particulates scoured from the walls.

An alternate treatment to decoke the furnace tube is to "burn" the carbon out. When the tube is taken off line, air and steam are passed through the tube at a high temperature to cause the coke to burn. The progress of the process may be measured in a number of different ways including measuring the carbon dioxide and carbon monoxide content in gasses leaving the furnace, measuring the tube metal temperature or the outlet temperature of the furnace.

U.S. Pat. No. 8,152,993 issued Apr. 10, 2012 to DeHaan et al., assigned to Lummus Technology Inc., teaches one method to decoke a furnace tube by burning out the coke. The patent does not teach or suggest any additional treatment or component in the gas passing through the furnace tube other than steam or air.

U.S. Pat. No. 6,602,483 issued Aug. 5, 2003 to Heyse et al., assigned to Chevron Phillips from an application having an earliest filing date of Jan. 4, 1994 (now expired) teaches a chemicals conversion process such as steam cracking wherein at least a portion of the reactor is clad with a group VIB metal (e.g. Cr). The cladding prevents carburization of the internal reactor surface.

There are a series of patents in the name of Benum assigned to NOVA Chemicals which teach forming a spinel surface on the interior surface of furnace tubes to reduce coke formation.

There are patents which teach the use of sulphur additives to the feedstock to reduce the formation of coke. One example of such art is U.S. Pat. No. 8,791,314 issued Jul. 29, 2014 to Fremy et al., assigned to Arkema France.

The above art does not teach the burn out decoking procedures.

U.S. Pat. No. 5,298,091 issued Mar. 29, 1994 to Edwards III assigned to United Technologies Corporation teaches nitriding the surface of components of a jet engine which come in contact with hydrocarbons at elevated temperatures. The patent teaches nitriding the metal surface at a temperature from about 1800° F. to 1850° F. (about 1000° C.) in an atmosphere selected from nitrogen, nitrogen and hydrogen and ammonia. The treated steel is then cooled at a controlled rate. The patent teaches against an atmosphere comprising steam and nitrogen in a weight ratio from 1:4 to 2:4.

The present disclosure seeks to provide a decoking procedure which is simple and helps to provide an enhanced surface on the parts of the equipment in contact with a hydrocarbon environment to resist coking.

In one embodiment the present disclosure provides in the decoking of a reactor for the conversion of a chemicals feedstock at a temperature greater than 700° C. the final step comprising treating a scoured reactor surface which contacts the hydrocarbons with a mixture comprising steam and nitrogen in a weight ratio from 4:1 to 1:1, in some embodiments from 4:1 to 4:2 in an amount from 500 to 3000 kg/hr. per reactor (furnace pass) at a temperature from 750° C. to 850° C. for a time not less than 10 minutes, in the absence of added oxygen (i.e. in the presence of trace amounts of oxygen in the steam, for example less than 10 parts per billion (ppb), desirably less than 5 ppb, in some embodiments less than 1 ppb of oxygen.

In a further embodiment the reactor comprises stainless steel chosen from wrought stainless, austenitic stainless steel and HP, HT, HU, HK HW and HX stainless steel, heat resistant steel, and nickel based alloys.

In a further embodiment the scouring comprises treating the surface of the reactor which contacts hydrocarbons with a steam scour at a rate of not less than 500 kg/hr./reactor for a time from 0.25 to 10 hours, in some embodiments from 0.25 to 1 hours, in other embodiments from 0.5 to 10 hours.

In a further embodiment the reactor has been previously subject to a decoking air burn for a period of time sufficient so that the air stream leaving the reactor has a total carbon content less than 5,000 ppm.

In a further embodiment subsequent to, or concurrent with the treatment with nitrogen and steam the reactor is optionally treated with a chemical to reduce coking chosen from compounds of the formula $RS_nR'$ with n being the mean sulphur number ranging from 1 to 12 and R and R' chosen from H and a linear or branched $C_1$-$C_6$ alkyl, cycloalkyl or aryl radicals in an amount from 50 ppm to 2,500 ppm In a further embodiment the stainless steel comprises not less than 16 wt % of chromium.

In a further embodiment the steel is chosen from 315 stainless steel, 316 stainless steel, austenitic stainless steel and HP, HT, HU, HW and HX stainless steel.

In a further embodiment during or subsequent to decoking no chemical to reduce coking is added to the reactor.

In a further embodiment the treated surface of the reactor is nitrided to a surface thickness from about 0.00001 to about 0.00005 inches.

In a further embodiment the reactor is a cracker for $C_{2-4}$ hydrocarbons.

In a further embodiment the reactor is a cracker for naphtha, HAC (heavy aromatic concentrate) and or HAGO (heavy aromatic gas oils)

Numbers Ranges

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the properties that the present disclosure desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Lower alkanes are typically cracked at temperatures from about 750° C. to about 950° C. in some embodiments from about 800° C. to about 900° C. as the feed passes through a heated pipe or coil or pass for a period of time from about 0.001 to 0.1 seconds. During the reaction the molecules of feed decompose and the components recombine to form the desired alkene, hydrogen and by products. The reaction takes place under aggressive conditions which also lead to the formation of coke which deposits on the internal walls of the reactor or furnace tube or pass. This coke must be removed as the pressure drop across the reactor, or tube increases and the thermal conductivity across the reactor wall or furnace tube wall decreases.

In one embodiment of the present disclosure the coke is removed by burning. A mixture of steam and air is passed through the coil while it is maintained at an elevated temperature from about 780° C. to about 900° C., in some embodiments from 790° C. to 850° C. in some embodiments from 800° C. to 830° C. The amount of air fed to the tube or coil depends on the furnace and the tube design. In some instances the air may be fed to the coil at a rate from about 10 kg/hr. to about 400 kg/hour. Dilution steam is fed to the reactor to provide an initial weight ratio of steam to air from about 200:1 to about 170:3. The decoke is completed when the amount of carbon ($CO_2$ and CO) in the exhaust stream from the tube or coil is below about 2,000 ppm. In some embodiments of the procedure, the rate of air feed to the coil may be increased up to about 1000 kg/hr./reactor as a post burn, surface polishing step.

During the decoke procedure the temperature in the combustion side of the cracker (sometimes called the radiant box) may range from about 790° C. to about 1100° C.

The rate of decoking needs to be controlled to minimize or limit spalling of coke from the coil as this may interfere with downstream operation. Also during decoking the temperature of the tube should be maintained as uniform as possible to prevent damage to the tube.

The decoking may be finished with a steam scour at a steam feed rate of not less than 2500 kg/hr./reactor for a time from 0.5 to 10 hours, in some embodiments from about 6 to 9 hours under the same temperature conditions as the burn out decoke.

Polish:

When the concentration of $CO_2$ at the coil exit is below or about 2,000 ppm the airflow to the coil is stopped. A mixture of steam and purified nitrogen (at least 99.99% pure less than 5 ppm of oxygen for example less than 2 ppm oxygen with only trace levels of CO and $CO_2$) is fed to the reactor in a weight ratio from 4:1 to 1:1 in an amount from 500 to 3000 kg/hr. per reactor pass at a temperature from 750° C. to 850° C. This is done in the absence of any added air or oxygen. The treatment is continued for a period of time not less than 10 minutes in some instances up to 5 hours, for example between 1 and 2 hours. In some instances the coil may be further subject to a high temperature hold or soak treatment at a temperature from about 800° C. to about 850° C., for example less than 830° C. for a further time from about 20 minutes to an hour, for example from about 25 to 45 minutes, in some embodiments from 25 to 35 minutes.

The treatment results in the nitriding of the surface of the steel substrate. The surface of the steel substrate is nitrided to a surface thickness from about 0.00001 to about 0.00005 inches.

In some embodiments an anti-coking agent may also be included in the steam/nitrogen feed for the polish treatment or subsequent to the polish treatment. Many anti-coking agents are known to those skilled in the art. In some embodiments the anti-coking agent may be chosen from compounds of the formula $RS_nR'$ with n being the mean sulphur number ranging from 1 to 12 and R and R' chosen from H and a linear or branched $C_1$-$C_6$ alkyl, cycloalkyl or aryl radicals. The anti-coking agent is added to the polish feed or a steam feed if the treatment is subsequent to the polish in an amount from 15 ppm to 2500 ppm. For a period of time from 0.5 to 12, hours, for example from about 1 to 6 hours.

The present disclosure is applicable to steels typically comprising at least 12 wt. % Cr, for example at least 16 wt. % of Cr. The steel may be chosen from 304 stainless steel, 310 stainless steel, 315 stainless steel, 316 stainless steel, austenitic stainless steel and HP, HT, HU, HK, HW and HX stainless steel.

In one embodiment the stainless steel, for example heat resistant stainless steel typically comprises from 13 to 50, for example 20 to 50, or for example from 20 to 38 weight % of chromium. The stainless steel may further comprise from 20 to 50, for example from 25 to 50 or for example from 25 to 48, desirably from about 30 to 45 weight % of Ni. The balance of the stainless steel is substantially iron.

The present disclosure may also be used with nickel and/or cobalt based extreme austenitic high temperature alloys (HTAs). Typically the alloys comprise a major amount of nickel or cobalt. Typically the high temperature nickel based alloys comprise from about 50 to 70, for example from about 55 to 65 weight % of Ni; from about 20 to 10 weight % of Cr; from about 20 to 10 weight % of Co; and from about 5 to 9 weight % of Fe and the balance one or more of the trace elements noted below to bring the composition up to 100 weight %. Typically the high temperature cobalt based alloys comprise from 40 to 65 weight % of Co; from 15 to 20 weight % of Cr; from 20 to 13 weight % of Ni; less than 4 weight % of Fe and the balance one or more trace elements as set out below and up to 20 weight % of W. The sum of the components adding up to 100 weight %.

In some embodiments of the invention the substrate may further comprise at least 0.2 weight %, up to 3 weight % for example 1.0 weight %, up to 2.5 weight % for example not more than 2 weight % of manganese from 0.3 to 2, for example 0.8 to 1.6 for example less than 1.9 weight % of Si; less than 3, for example less than 2 weight % of titanium, niobium (for example less than 2.0, or for example less than 1.5 weight % of niobium) and all other trace metals; and carbon in an amount of less than 2.0 weight %.

The present disclosure may also be used with 35 wt. % nickel and 45 wt. % chromium based alloys with an amount of aluminum of up to 4% with a propensity to form an aluminum oxide layer or an alumina layer on the inner surface of a reactor or pass.

However as noted above the process is also suitable for 304, 310, 315 and 316 stainless steel.

The process of the present disclosure protects oxide surfaces on the interior of the coil and also reduces subsequent coking in the TLE for the coil.

The process offers the benefit of minimizing the tube carburization rate by resisting carbon diffusion during the cracking process into the bulk metal of the tube potentially extending tube in-service life. This process also aids in the removal of coke matter in the cooler parts of the cracking process like the transfer line exchangers (TLE) inlets. The ultimate resistance to fouling leads to longer run times, with higher ethylene yields and less stress to the tubes during subsequent decokes. The nitriding step has made furnace swings easier because the dimethyl disulphide (DMDS) passivation step is no longer required. DMDS is now used to limit CO production and to help manage metal dusting. This reduces the expense of the DMDS and improves the environmental risk by requiring fewer loads of DMDS coming to the site.

The present invention will now be illustrated by the following non-limiting example.

An older ethylene cracking furnace at Joffre was brought down for a decoke. The following decoke procedure was used:

The coil was subjected to an 88 hour air burn with 1700 kg/hr./coil dilution steam flow. Following the coke burn the coil was subjected to an 8 hour steam scour with 2500 kg/hr./coil. The scoured tube was then subjected to a 2 hour treatment with a mixed flow of steam and nitrogen in a ratio (mass) of 4:1 for a total flow 2500 kg/hr./coil. The tube was then subject to a start-up procedure using a high rate of dilution steam over 2 days.

Samples taken from the furnace tube at the next shutdown showed a nitride layer up to about 0.00005 inches. Samples of the steel showed a lower rate/depth of carburization than that in comparable samples of coil that had not been subjected to nitriding. The reduced carburization contributes to a reduction in metal fatigue in the pass and extended life of the tube.

What is claimed is:

1. A decoking process for a reactor for the conversion of a chemicals feedstock at a temperature greater than 700° C., the decoking process comprising
    a multistep step decoking process to scour an internal reactor surface,
    a polishing step wherein the scoured internal reactor surface is treated with a mixture consisting of steam and nitrogen in a weight ratio from 4:1 to 1:1 in an amount from 500 to 3000 kg/hr per reactor at a temperature from 750° C. to 850° C. for a time not less than 20 minutes, in the absence of added oxygen and in absence of chemicals used to reduce coking.

2. The process according to claim 1, wherein the reactor comprises stainless steel chosen from wrought stainless steel, austenitic stainless steel, HP stainless steel, HT stainless steel, HU stainless steel, HK stainless steel, HW stainless steel, HX stainless steel, heat resistant stainless steel, and nickel based alloys.

3. The process according to claim 2 wherein the stainless steel comprises not less than 16 wt % of chromium.

4. The process according to claim 1 wherein treating the scoured internal scoured reactor surface occurs for a time from 0.25 to 10 hours.

5. The process according to claim 1 wherein treating the scoured internal scoured reactor surface occurs for a time from 0.5 to 10 hours.

6. The process according to claim 5, wherein the stainless steel is chosen from 315 stainless steel, 316 stainless steel, austenitic stainless steel, HP stainless steel, HT stainless steel, HU stainless steel, HW stainless steel, and HX stainless steel.

7. The process according to claim 1 wherein the multistep step decoking process comprises a decoking air burn for a period of time sufficient so that an air stream leaving the reactor has a total carbon content less than 2,000 ppm.

8. The process according to claim 1 further comprising a step subsequent to the polishing step wherein, the reactor is treated with dimethyl disulphide (DMDS) to limit CO production and to help manage metal dusting.

9. The process according to claim wherein the reactor is a cracker for $C_2$-$C_4$ hydrocarbons.

10. The process according to claim 6, wherein the reactor is a cracker for naphtha, HAC (heavy aromatic concentrate) or HAGO (heavy aromatic gas oils).

* * * * *